Nov. 9, 1965  F. J. HERRINGTON, JR., ETAL  3,216,880
ROTARY SLIT SEALER

Filed Oct. 8, 1962  2 Sheets-Sheet 1

INVENTORS
FOX J. HERRINGTON, Jr.
ROY B. SNYDER
BY Lawrence Rosen

Nov. 9, 1965  F. J. HERRINGTON, JR., ETAL  3,216,880
ROTARY SLIT SEALER
Filed Oct. 8, 1962  2 Sheets-Sheet 2

INVENTORS
FOX J. HERRINGTON, Jr.
ROY B. SNYDER
BY Lawrence Risen

United States Patent Office 3,216,880
Patented Nov. 9, 1965

3,216,880
ROTARY SLIT SEALER
Fox J. Herrington, Jr., and Roy B. Snyder, Rochester, N.Y., assignors to National Distillers and Chemical Corporation, New York, N.Y., a corporation of Virginia
Filed Oct. 8, 1962, Ser. No. 229,124
1 Claim. (Cl. 156—515)

This invention relates to a novel slit-sealer unit for longitudinally slitting a tubular film of thermoplastic material into a first and second tube portion.

Equipment for extruding a tube of plastic film is well known in the art shown, for example, in copending application, Serial Number 232,431, filed October 23, 1962. This equipment operates at a given maximum speed regardless of the diameter of the tube being extruded. Where tubes of diameter smaller than the diameter capacity of the equipment are required, the larger diameter tube is first extruded and this tube, when flattened, is passed through a slitting and sealing mechanism which slits the tube longitudinally and seals the longitudinally slit ends so that two or more parallel tubes are formed. With this type of operation, the capacity of a given machine can be considerably increased when extruding small diameter tubes.

In the past, and when this slitting and sealing operation has been performed on relatively thin tubular films of polyethylene or polypropylene or the like, the sealing has been unsatisfactory. That is to say, the practice has been to first slit the film longitudinally with a razor and to thereafter seal with a well known type of seal bar heated which runs along the slit edges of the tube to form a sealing bead. (When the film is extremely thin, however (or of the order of 1 mil), it was found that after slitting the edges of the slit film do not stay together or wrinkle so that the edges are either imperfectly sealed or are not sealed at all.

The principle of the present invention, is to perform the slitting and sealing operation on relatively thin film while the film is tensioned by passing over a drum. The drum contains annular slots in the surface thereof which can have a cutting and sealing bar extending therein for cutting and sealing the film longitudinally as it passes over the drum.

It is generally believed that the bending of the film over the drum sets up a longitudinal force spread over the length of the film. Thus, the slit edges of the tube are held fast against wrinkling or spreading to permit an effective sealing operation to be performed.

To improve the frictional characteristics of the drum, it may be covered with an appropriate rubber material which has the aforementioned slots cut therein.

Accordingly, a primary object of this invention is to provide a novel rotary slit sealer for plastic film tubes having a thickness of the order of 1.0 mil.

Another object of this invention is to provide a novel rotary slit sealer for slitting and sealing thermoplastic film tubes into two or more longitudinally extending tubes wherein the edges of the slit film are positively held together to permit an effective sealing operation.

A further object of this invention is to provide a novel rotary slit sealer for tubes of film which are to be longitudinally slit wherein the operation is performed while the film runs over a drum which has annular notches therein for receiving the cutting and sealing apparatus.

These and other objects of our invention will become apparent from the following description when taken in connection with the drawings, in which.

Figure 3:
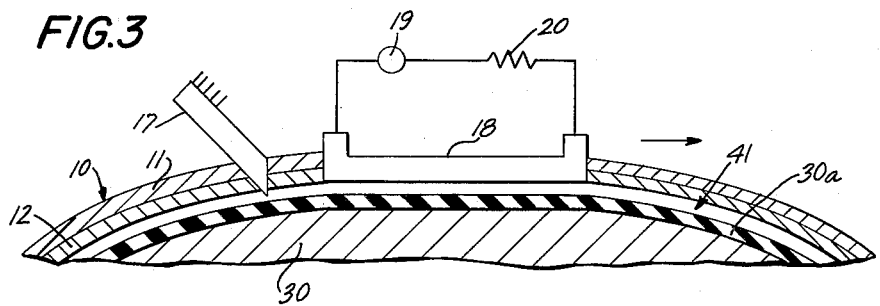

FIGURE 3 schematically illustrates the seal bar and cutting knife in a cross-sectional view.

Figure 4:
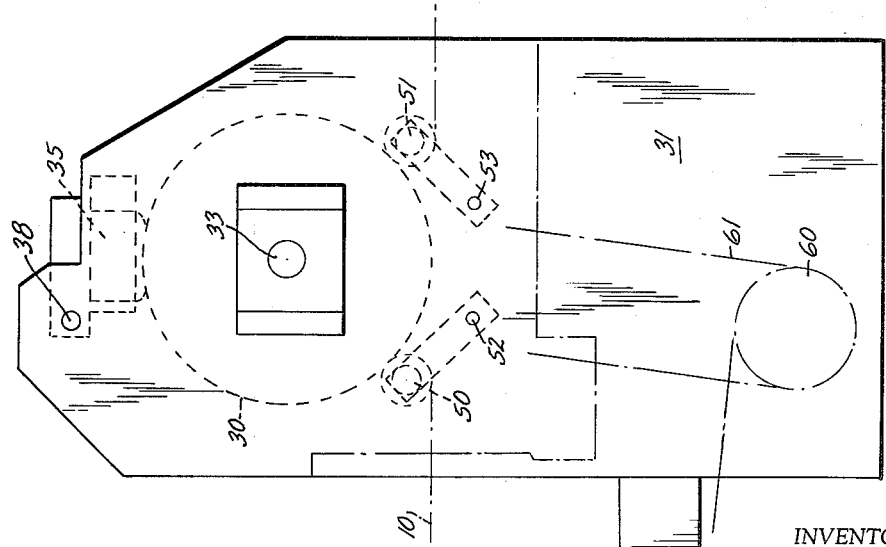

FIGURE 4 shows a side plan view of the rotary slit sealer apparatus.

Figure 5:
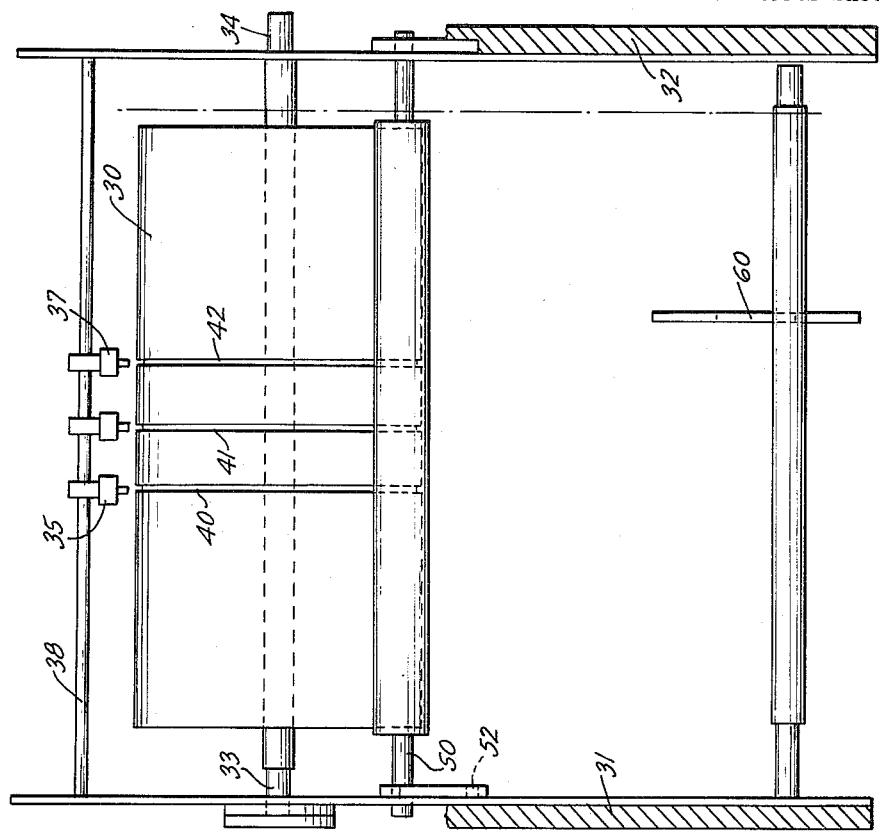

FIGURE 5 shows a side plan view of FIGURE 4 shown partially in cross-section.

Figure 1:
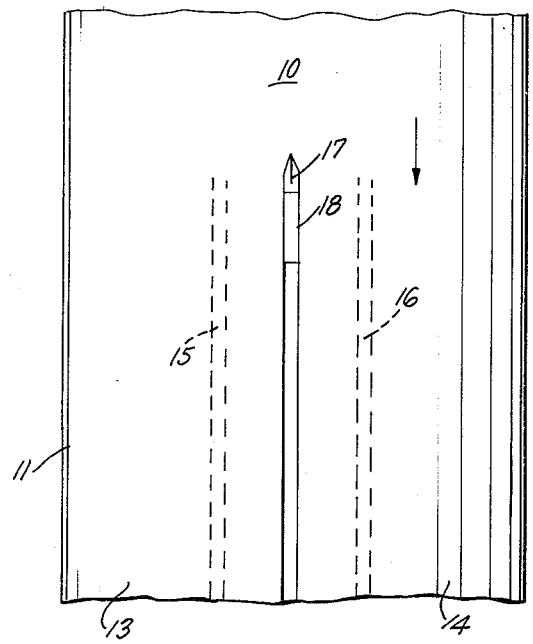
FIGURE 1 is a plan view of a partial length of a flattened tube of thermoplastic film which has been slit and sealed to form 2 parallel tubes.
Figure 2:
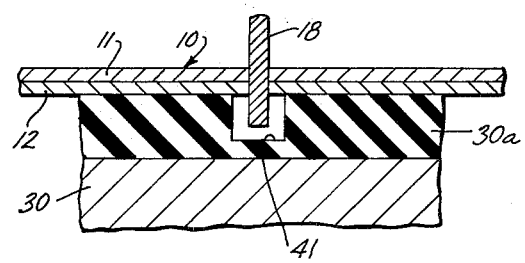
FIGURE 2 illustrates a cross-sectional view of the sealing bar which seals the adjacent edges of the slit film where the sealing bar rides in an annular channel in a rotating rubber covered drum.

Referring now to the figures, FIGURES 1, 2 and 3 illustrate a flattened plastic tube 10 which includes an upper panel 11 and lower panel 12 where the thickness of each panel is of the order of 0.6 mil.

The panel may be formed of a polyethylene film which has been drawn in the tubular shape by a process of the prior art.

In order to make full use of the capacity of the machine extruding the tube where relatively small diameter films are required, it is possible, as seen in FIGURE 1, to cut the tube 10 into two tube sections 13 and 14. Clearly, for tubes having the diameter of tubes 13 and 14, the output in terms of footage of film of machine would be greater than for the output of a single tube 10. Where a still smaller diameter tube is permissible it will be apparent that tube 10 could be cut along dotted lines as indicated by dotted lines 15 and 16 in FIGURE 1 so that three parallel tubes could be continuously formed.

In order to perform this operation, it is the practice to place a razor 17 and seal bar 18 in the path of longitudinal motion of tube 10 so that the tube is first slit by razor 17 with the slit edges of the upper and lower panels thereafter being sealed together by the seal bar 18, to complete the tubes 13 and 14. The seal bar 18 is of any appropriate high resistance material which is electrically heated as by passing an electrical current through bar 18 as schematically indicated by the voltage source 19 and current limiting resistor 20. The seal bar 18 can have a typical thickness of the order of 0.020 inch and a depth of the order of a ¼ of an inch. It has been found in some applications that the razor 17 can be eliminated with the seal bar 18 performing both the slitting and sealing operation. The actual details of the seal bar 18 are beyond the scope of the present invention and details to the construction of such construction of seal bars are well known to those skilled in the art.

It has been found that when the thickness of the film wall becomes very small (less than 1 mil), that after the cutting operation, the adjacent edges of the slit material tends to separate or to wrinkle. This will clearly prevent the formation of an effective seal along the slit longitudinal ends of tubes 13 and 14 to complete the slitting and sealing operation.

In accordance with the present invention, the film 10 is slit and sealed while running over a drum such as drum 30 of FIGURES 2, 3, 4 and 5 which distributes a longitudinal tension over the full width of the tube whether or not the tube has been slit longitudinally.

Referring now to FIGURES 4 and 5, in accordance with the present invention, a drum 30 which may be rubber covered by cover 30a is carried on a support frame which includes support sides 31 and 32 with the drum shaft ends 33 and 34 being carried by sides 31 and 32, respectively.

A plurality of cutting knives 35, 36 and 37 which can be combinations of a cutting knife such as knife 17 and a seal bar 18 as in FIGURE 3, are then carried on rod 38 which is also carried by panels 31 and 32. The cutting units 35, 36 and 37 may be adjustably positioned along the axis of shaft 38 and are rotatable about the axis of shaft 38 so that they can be moved between an operative and inoperative position. If desired, hydraulic moving means for rendering the units operative or inoperative may be provided.

The rubber covering 30a of drum 30 is then provided with a plurality of annual notches such as notches 40, 41 and 42 which cooperate with slitting and sealing units 35, 36 and 37 respectively. The units are so arranged that as shown in FIGURE 2 for the case of notch 41 the sealing bar 18 of unit 36 enters about halfway into the notch. By way of example, the annular notch 41 may have a depth of approximately 0.25 inch and a width of approximately 0.06 to 0.10 inch. The sealing bar 18 will then extend approximately 1/8 of an inch, into the notch 41.

When the unit 36 is in the operative position shown in FIGURE 2, units 35 and 37 will be withdrawn and inoperative whereupon slitting and sealing will proceed as shown in solid lines in FIGURE 1 where the tube 10 is cut and sealed into two tubular sections 13 and 14. Where it is desired to cut the bag in three sections as illustrated by the dotted lines in FIGURE 1, the cutting and sealing unit 37 will be withdrawn to an inoperative position and units 35 and 37 will be rendered operative as is apparent from the foregoing description.

An important feature of the present invention is that the film 10 be tightly wrapped around the drum 30. To this end, a pair of rollers 50 and 51 are mounted immediately adjacent roller 30 and are pivoted on pivotal shaft 52 and 53 respectively, which are pivoted with respect to the supporting side walls. A biasing means (not shown) then biases rollers 50 and 51 toward engagement with the drum 30.

The film 10 then enters the rotary slit sealer as best shown in FIGURE 4 by coming under roller 50, around drum 30, and under the roller 51. The film then leaves the unit and moves on for further processing or winding.

In order to assure appropriate tension on the film 10, the drum 30 can be separately driven as by operatively connecting a drive sprocket 60 to drum 30 by means of chain 61 to cause the drum 30 to rotate in the direction of motion of the film 10. The specific drive system used is not shown herein since driving drum 30 from sprocket 60 merely involves chain linkages which are well known to those skilled in the art.

Although certain specific embodiments of the invention have been described above, many variations and modifications will now be obvious to those skilled in the art, and it is preferred therefore to be limited not by the specific disclosure herein but only by the appended claim.

The embodiments of the invention in which an exclusive privilege or property is claimed are defined as follows:

A rotary slit sealer for longitudinally slitting and sealing an extruded tubular film of thermoplastic material; said rotary slit sealer comprising a slitting and sealing unit and a rotating drum; said extruded tubular film being partially wound over the surface of said drum; said slitting and sealing unit being mounted adjacent the surface of said drum; said slitting and sealing unit longitudinally slitting and sealing said tubular film while said film moves over the surface of said drum; said drum having an annular groove therein; said slitting and sealing unit being at least partially disposed in said groove; said groove lying in a plane perpendicular to the axis of said drum; and a rubber surface cover covering the exposed surface of said drum; said grooves formed in said rubber surface cover.

References Cited by the Examiner
UNITED STATES PATENTS

| | | | |
|---|---|---|---|
| 2,688,356 | 9/54 | Conti | 156—259 |
| 2,759,524 | 8/56 | Davis | 156—271 |
| 2,805,973 | 9/57 | Klasing et al. | 156—251 |
| 2,830,003 | 4/58 | Mason | 156—271 |
| 3,052,283 | 9/62 | Pierce et al. | 156—271 XR |

EARL M. BERGERT, *Primary Examiner.*